(12) United States Patent
Arimilli et al.

(10) Patent No.: US 6,574,714 B2
(45) Date of Patent: Jun. 3, 2003

(54) EFFICIENT INSTRUCTION CACHE COHERENCY MAINTENANCE MECHANISM FOR SCALABLE MULTIPROCESSOR COMPUTER SYSTEM WITH WRITE-BACK DATA CACHE

(75) Inventors: Ravi Kumar Arimilli, Austin, TX (US); John Steven Dodson, Pflugerville, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 09/782,579

(22) Filed: Feb. 12, 2001

(65) Prior Publication Data

US 2002/0112124 A1 Aug. 15, 2002

(51) Int. Cl.⁷ ................................................ G06F 12/08
(52) U.S. Cl. ........................ 711/141; 711/125; 711/143; 711/146; 711/122; 711/126
(58) Field of Search ................................. 711/141, 125, 711/143, 146, 122, 126

(56) References Cited

U.S. PATENT DOCUMENTS 6,164,840 A * 12/2000 Lynch ......................... 712/207
6,412,043 B1 * 6/2002 Chopra et al. ............... 711/118
6,480,800 B1 * 11/2002 Molyneaux et al. ......... 702/120

OTHER PUBLICATIONS

Jim Handy, Cache Memory Book, Copyright 1993, Acedemin Press Inc., pp. 62–70.*
Related Copending Application, Ravi Kumar Arimilli et al., Appln. Filed Feb. 12, 2001.

* cited by examiner

Primary Examiner—Reginald G. Bragdon
Assistant Examiner—Midys Inoa
(74) Attorney, Agent, or Firm—Casimer K. Salys; Bracewell & Patterson, L.L.P.

(57) ABSTRACT

A method of maintaining coherency in a cache hierarchy of a processing unit of a computer system, wherein the upper level (L1) cache includes a split instruction/data cache. In one implementation, the L1 data cache is store-through, and each processing unit has a lower level (L2) cache. When the lower level cache receives a cache operation requiring invalidation of a program instruction in the L1 instruction cache (i.e., a store operation or a snooped kill), the L2 cache sends an invalidation transaction (e.g., icbi) to the instruction cache. The L2 cache is fully inclusive of both instructions and data. In another implementation, the L1 data cache is write-back, and a store address queue in the processor core is used to continually propagate pipelined address sequences to the lower levels of the memory hierarchy, i.e., to an L2 cache or, if there is no L2 cache, then to the system bus. If there is no L2 cache, then the cache operations may be snooped directly against the L1 instruction cache.

23 Claims, 3 Drawing Sheets

EFFICIENT INSTRUCTION CACHE COHERENCY MAINTENANCE MECHANISM FOR SCALABLE MULTIPROCESSOR COMPUTER SYSTEM WITH WRITE-BACK DATA CACHE

CROSS-REFERENCE TO RELATED APPLICATION

The present invention is related to U.S. patent application Ser. No. 09/782,578 entitled "EFFICIENT INSTRUCTION CACHE COHERENCY MAINTENANCE MECHANISM FOR SCALABLE MULTIPROCESSOR COMPUTER SYSTEM WITH WRITE-BACK CACHE", which is hereby incorporated.

BACKGROUND OF THE INVENTION

1. Field of the Invention

The present invention generally relates to computer systems, specifically to multiprocessor computer systems having caches which share memory values (program instructions and operand data), and more particularly to an improved method of maintaining cache coherency in a cache architecture having bifurcated instruction and data caches.

2. Description of the Related Art

The basic structure of a conventional multiprocessor computer system 10 is shown in FIG. 1. Computer system 10 has several processing units, two of which 12a and 12b are depicted, which are connected to various peripheral devices, including input/output (I/O) devices 14 (such as a display device, keyboard, graphical pointer (mouse), and a permanent storage device or hard disk), memory device 16 (such as random access memory (RAM)) that is used by the processing units to carry out program instructions, and firmware 18 whose primary purpose is to seek out and load an operating system from one of the peripherals (usually the permanent memory device) whenever the computer is first turned on. Processing units 12a and 12b communicate with the peripheral devices by various means, including a generalized interconnect or bus 20, or direct memory access channels (not shown). Computer system 10 may have many additional components which are not shown, such as serial, parallel, and universal system bus (USB) ports for connection to, e.g., modems, printers or scanners. There are other components that might be used in conjunction with those shown in the block diagram of FIG. 1; for example, a display adapter might be used to control a video display monitor, a memory controller can be used to access memory 16, etc. The computer can also have more than two processing units.

In a symmetric multi-processor (SMP) computer system, all of the processing units are generally identical, that is, they all use a common set or subset of instructions and protocols to operate, and generally have the same architecture. A typical architecture is shown in FIG. 1. A processing unit includes a processor core 22 having a plurality of registers and execution units, which carry out program instructions in order to operate the computer. An exemplary processing unit includes the PowerPC™ processor marketed by International Business Machines Corporation of Armonk, N.Y. The processing unit can also have one or more caches, such as an instruction cache 24 and a data cache 26, which are implemented using high speed memory devices. Caches are commonly used to temporarily store values that might be repeatedly accessed by a processor, in order to speed up processing by avoiding the additional latency of loading the values from memory 16. These caches are referred to as "on-chip" when they are integrally packaged with the processor core on a single integrated chip 28. Each cache is associated with a cache controller (not shown) that manages the transfer of data and instructions between the processor core and the cache memory.

A processing unit can include additional caches, such as cache 30, which is referred to as a level-two (L2) cache since it supports level-one caches 24 and 26. In other words, cache 30 acts as an intermediary between memory 16 and the on-board caches, and can store a much larger amount of information (instructions and data) than the on-board caches can, but at a longer access penalty. For example, cache 30 may be a chip having a storage capacity of 512 kilobytes, while the processor may be an IBM PowerPC™ 604-series processor having on-board caches with 64 kilobytes of total storage. Cache 30 is connected to bus 20, and all loading of information from memory 16 into processor core 22 must come through cache 30. Although FIG. 1 depicts only a two-level cache hierarchy, multi-level cache hierarchies can be provided where there are many levels (L3, L4, etc.) of serially connected caches.

In a multi-level cache, if a copy of a value is in every level of the cache, the cache hierarchy is referred to as "inclusive." It is not necessary, however, to keep a copy of each value in the lower levels, and an inclusivity bit field may be added to the caches to indicate whether or not the cache is inclusive. For example, a three-level cache structure might provide an L3 cache which was not inclusive, such that a value residing in the L2 cache might not be present in the L3 cache. In this example, if an L2 cache issues a read command for a value that is not present in any of the caches of that processing unit, it can be passed to that L2 cache without (necessarily) loading it into the L3 cache.

In an SMP computer, it is important to provide a coherent memory system, that is, to cause write operations to each individual memory location to be serialized in some order for all processors. By way of example, assume a location in memory is modified by a sequence of write operations to take on the successive values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent." Nearly all coherency protocols operate only to the granularity of the size of a cache block. That is to say, the coherency protocol controls the movement of and write permissions for operand data or instructions on a cache block basis, and not separately for each individual memory location.

There are a number of protocols and techniques for achieving cache coherence that are known to those skilled in the art. All of these mechanisms for maintaining coherency require that the protocols allow only one processor to have a "permission" that allows a write operation to a given memory location (cache block) at any given point in time. As a consequence of this requirement, whenever a processing element attempts to write to a memory location, it must inform all other processing elements of its desire to write the location and receive permission from all other processing elements to carry out the write.

To implement cache coherency, the processors in the data processing system communicate over a common generalized interconnect (i.e., bus 20). The processors pass messages over the interconnect indicating their desire to read from or write to memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory 16 to one or more of the caches in the system (as mentioned above). If a processor (say 12a) attempts to access a memory location not present within its cache hierarchy, the correct version of the block, which contains the actual (current) value for the memory location, may either be in the system memory 16 or in one of more of the caches in another processing unit, e.g. processing unit 12b. If the correct version is in one or more of the other caches in the system, it is necessary to obtain the correct value from the cache(s) in the system instead of system memory.

For example, consider a processor, say 12a, attempting to read a location in memory. It first polls its own L1 cache (24 or 26). If the block is not present in the L1 cache, the request is forwarded to the L2 cache (30). If the block is not present in the L2 cache, the request is forwarded on to lower cache levels, e.g., the L3 cache. If the block is not present in the lower level caches, the request is then presented on the generalized interconnect (20) to be serviced. Once an operation has been placed on the generalized interconnect, all other processing units snoop the operation and determine if the block is present in their caches. If a given processing unit has the block requested by processing unit in its L1 cache, and the value in that block is modified, and any lower level caches also have copies of the block, then their copies are stale, since the copy in the processor's cache is modified. Therefore, when the lowest level cache (e.g., L3) of the processing unit snoops the read operation, it will determine that the block requested is present and modified in a higher level cache. When this occurs with an in-line cache structure, the L3 cache places a message on the generalized interconnect informing the processing unit that it must "retry" its operation again at a later time, because the actual value of the memory location is in the L1 cache at the top of the memory hierarchy and must be retrieved to make it available to service the read request of the initiating processing unit.

Once the request from an initiating processing unit has been retried, the L3 cache begins a process to retrieve the modified value from the L1 cache and make it available at the L3 cache, main memory or both, depending on the exact details of the implementation. To retrieve the block from the higher level caches, the L3 cache sends messages through the inter-cache connections to the higher level caches, requesting that the block be retrieved. These messages propagate up the processing unit hierarchy until they reach the L1 cache and cause the block to be moved down the hierarchy to the lowest level (L3 or main memory) to be able to service the request from the initiating processing unit.

The initiating processing unit eventually re-presents the read request on the generalized interconnect. At this point, however, the modified value has been retrieved from the L1 cache of a processing unit and placed into system memory, and the read request from the initiating processor will be satisfied. The scenario just described is commonly referred to as a "snoop push". A read request is snooped on the generalized interconnect which causes the processing unit to "push" the block to the bottom of the hierarchy to satisfy the read request made by the initiating processing unit.

Thus, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections. As one example of this mechanism, when a processing unit executes a read the processing unit receives a message indicating whether or not the read must be retried (i.e., reissued later). If the read operation is not retried, the message usually also includes information allowing the processing unit to determine if any other processing unit also has a still active copy of the block (this is accomplished by having the other lowest level caches give a "shared" or "not shared" indication for any read they do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write to the block without first communicating with other processing units in the system because no other processing unit has a copy of the block. Therefore, it is possible for a processor to read or write a location without first communicating this intention onto the interconnection, but only where the coherency protocol has ensured that no other processor has an interest in the block.

The foregoing cache coherency technique is implemented in a specific protocol referred to as "MESI." In this protocol, a cache block can be in one of four states, "M" (Modified), "E" (Exclusive), "S" (Shared) or "I" (Invalid). Under the MESI protocol, each cache block (e.g., a 32-byte block) has two additional bits which indicate the state of the entry, out of the four possible states. Depending upon the initial state of the block and the type of access sought by the requesting processor, the state may be changed, and a particular state is set for the block in the requesting processor's cache. For example, when a block is in the Modified state, the addressed block is valid only in the cache having the modified block, and the modified value has not been written back to system memory. When a block is Exclusive, it is present only in the noted block, and is consistent with system memory. If a block is Shared, it is valid in that cache and possibly in at least one other cache, all of the shared blocks being consistent with system memory. Finally, when a block is Invalid, it indicates that the addressed block is not resident in the cache.

Cache instructions allow processor-executed software to manage the cache. Some of the instructions are supervisory level (performed only by the computer's operating system), and some are user level (performed by application programs). The flush instruction (data cache block flush—"dcbf") causes a cache block to be made available by invalidating the cache block if it contains an unmodified ("Shared" or "Exclusive") copy of a memory block or, if the cache block contains a modified copy of a memory block, then by first writing the modified value downward in the memory hierarchy (a "push"), and thereafter invalidating the block. Kill instructions (data cache block invalidate—"dcbi," instruction cache block invalidate—"icbi," or data cache block set to zero—"dcbz") are similar to the flush instruction except that a kill instruction immediately forces a cache block to an invalidate state, so any modified block is killed without pushing it out of the cache. A clean instruction (data cache block store—"dcbst"), which affects only modified blocks, causes a modified block to be written to main memory. The touch instruction (data cache block touch—"dcbt") provides a method for improving performance through the use of software-initiated prefetch hints.

All of the foregoing cache instructions operate on a block whose size is referred to as the processor coherency granule. For many computers, the processor coherency granule is 32 bytes, i.e., the processor can operate on a 32-byte sector in a cache block of the L1 cache. The system bus granule, however, may be larger, for example, 64 bytes or 128 bytes, i.e., the full size of the cache line that is transmitted from the L2 cache to the system bus is 64 bytes or 128 bytes. In other words, an instruction sent along the system bus references a 64-byte word or a 128-byte word, not just 32 bytes. Coherency sizes can vary further, for example, having three coherency sizes with a two-level cache (a processor coherency granule of 32 bytes, an L1 coherency granule of 64 bytes, and an L2 /system bus coherency granule of 128 bytes).

This variation in coherency size along the memory hierarchy can lead to certain inefficiencies. For example, if a processor issues an "icbi" instruction to a particular 32-byte sector, an icbi operation will be transmitted on the system bus and be treated as a 64-byte operation; then, if the processor immediately issues another "icbi" operation for another 32-byte sector that was part of the same 64-byte word as the previous operation, then traditional systems will send a second 64-byte "icbi" operation to the same 64-byte word even though a single system bus operation would have sufficed to kill the two adjacent 32-byte sectors. Another problem can arise when two different processes or threads have issued cache coherency instructions which result in redundant performance of the same bus operation. For example, the cache operations queue may include two "icbi" instructions with the same operand, i.e., acting on exactly the same 32-byte cache sector. These instructions lead to redundant bus operations.

Another problem with the icbi instruction is that icbi bus operations must be globally broadcast to all processing units in a data processing system. For example, in a very large system, such as a non-uniform memory access (NUMA) system with 256 processors, an icbi operation must be broadcast to each of the 256 processing units. This is because in architectures in which instruction cache coherency is maintained by software, icbi must be issued anytime a cache block that contains instructions is modified. Each snooped icbi operation must propagate up the cache hierarchy at each processing unit, requiring very deep icbi snoop queues in large multiprocessor systems. These problems also adversely affect scalability of the multiprocessor system. Competing icbi instructions may further have to be resolved using hardware locks. It would, therefore, be desirable to devise an improved method of handling cache transactions which reduced the amount of system bus traffic. It would be further advantageous if the method could also provide for more efficient cache usage.

SUMMARY OF THE INVENTION

In accordance with the present invention, cache coherency is maintained in a cache hierarchy of a computer system in which the upper level (L1) cache has bifurcated instruction and data caches, that is, an L1 instruction cache for storing program instructions and an L1 data cache for storing operand data. In a first implementation of the invention, the L1 data cache is store-through, and each processing unit further has a lower level (e.g., L2) cache. When the lower level cache receives a cache operation requiring invalidation of a program instruction in the L1 instruction cache (i.e., a store operation or a snooped kill), the L2 cache sends an invalidation transaction (e.g., icbi) to the instruction cache. The L2 cache is fully inclusive of both instructions and data. In a second implementation of the present invention, the L1 data cache is write-back, and a store address queue in the processor core is used to continually propagate pipelined address sequences to the lower levels of the memory hierarchy, i.e., to an L2 cache or, if there is no L2 cache, then to the system bus. If there is no L2 cache, then the cache operations may be snooped directly against the L1 instruction cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
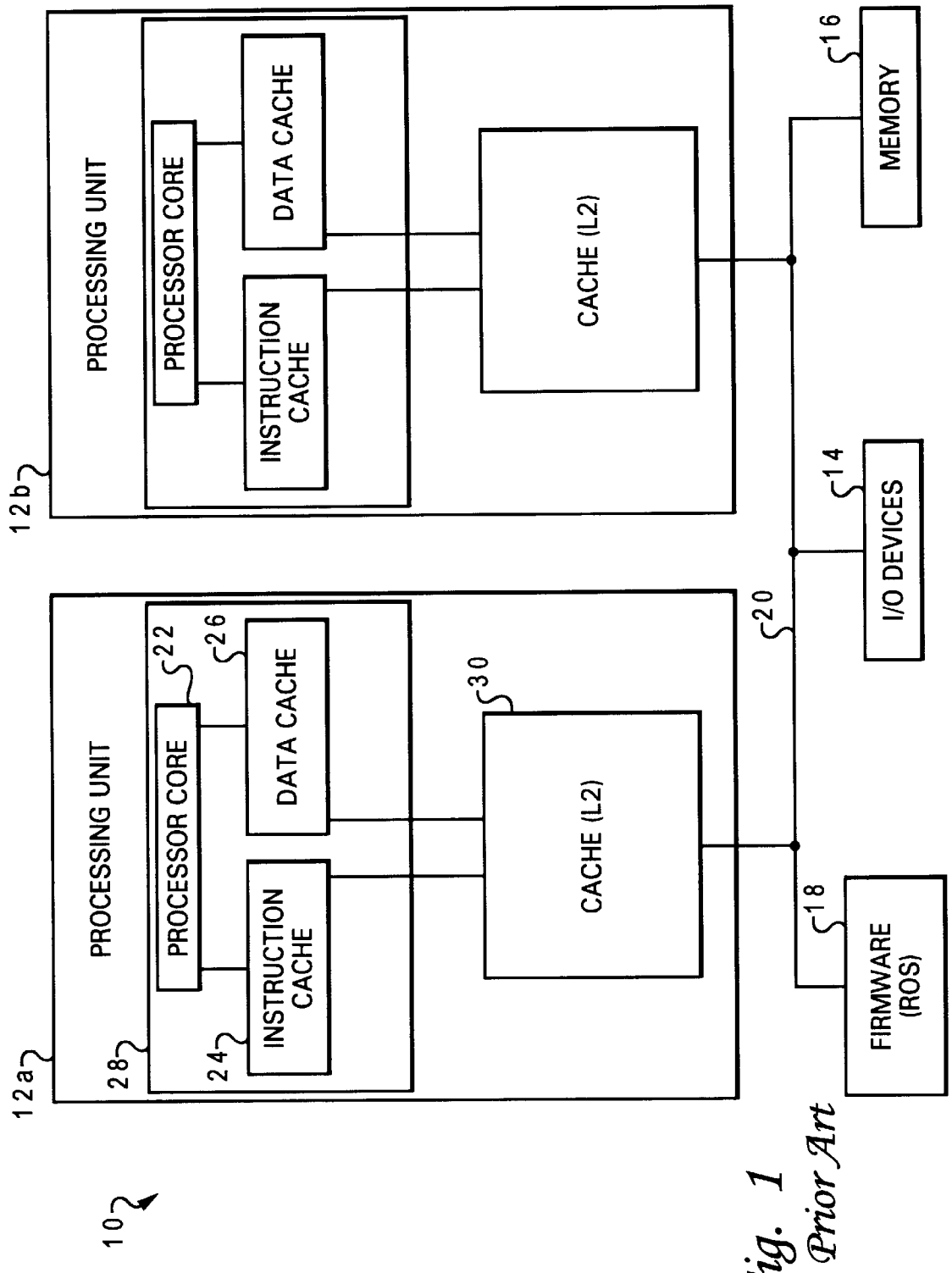
FIG. 1 is a block diagram of a prior art multiprocessor computer system.
Figure 2:
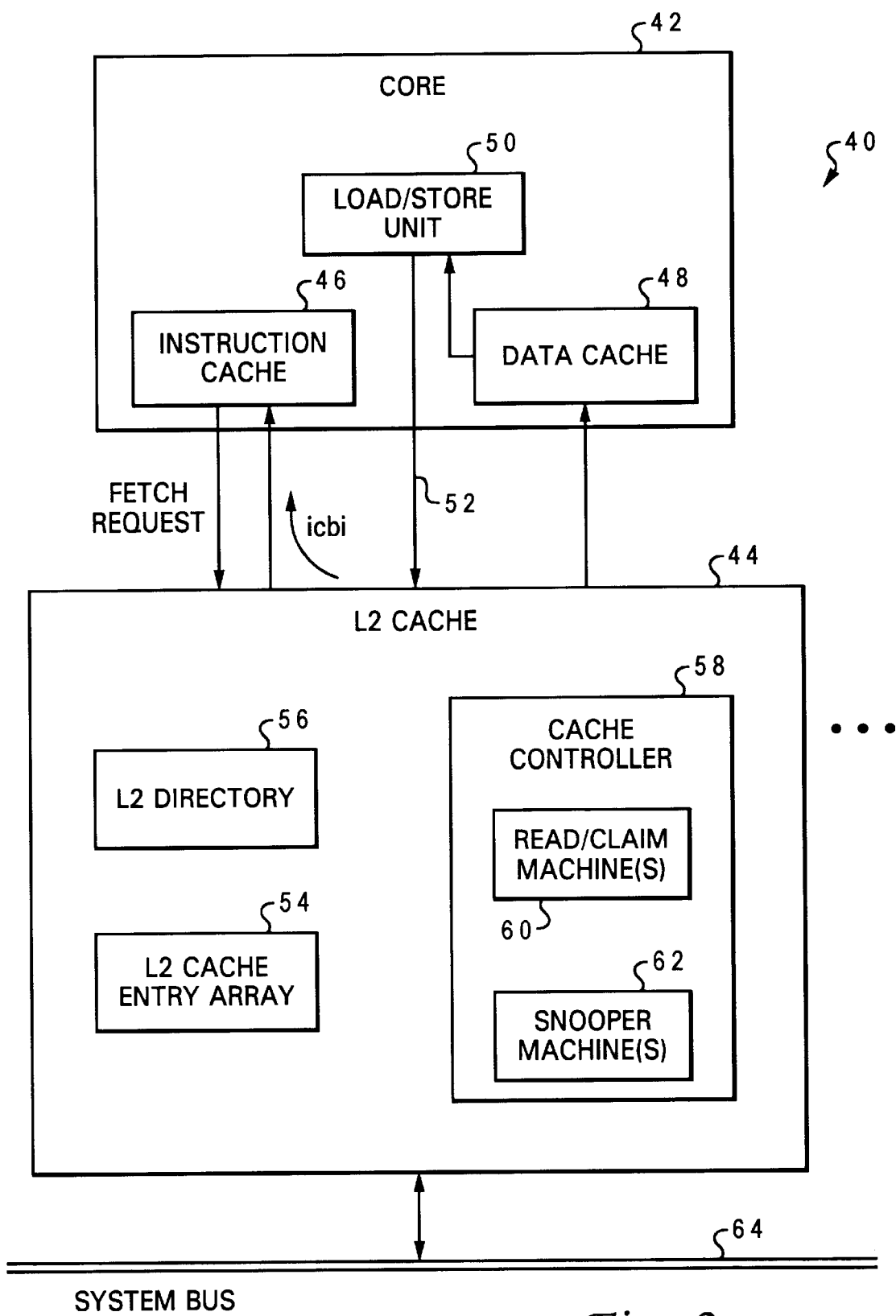
FIG. 2 is a block diagram of one embodiment of a processing unit of a multiprocessor computer system constructed in accordance with the present invention, depicting a store-through L1 data cache, with an L2 cache issuing a kill ("icbi") operation to the L1 instruction cache.

With reference now to the figures, and in particular with reference to FIG. 2, there is depicted an illustrative embodiment of one of the multiple processing units 40 of a multiprocessor computer system constructed in accordance with the present invention. While the present invention is directed to a method of handling instruction cache coherency in a multiprocessor system such as the system of FIG. 2, the present invention can also be implemented within computer systems that have additional hardware components not shown in FIG. 2 or a different interconnection architecture (or both). Those skilled in the art will therefore appreciate that the present invention is not limited to the generalized data processing system shown in FIG. 2.

Processing unit 40 primarily includes a processor core 42 and L2 cache 44. As shown, core 42 includes bifurcated L1 instruction and data caches, i.e., separate L1 instruction and data caches 46 and 48 for temporarily storing program instructions and operand data, respectively. L1 data cache 48 communicates with a load/store unit (LSU) 50 in core 42, which issues load (read) and store (write) requests to L1 data cache 48 in response to load and store program instructions within the instruction stream of core 42. In this embodiment, L1 data cache 48 is a store-through cache as indicated at 52.

L2 cache 44 is fully inclusive for both instructions and data, i.e., each cache line in L1 instruction cache 46 or L1 data cache 48 has a corresponding cache line in L2 cache 44. Due to (possibly) different granularities for the L1 and L2 caches, a single cache line in L2 cache 44 could actually contain both an instruction value and a data value, so each cache line in L2 cache 44 is provided with two inclusivity bits in L2 directory 56, one for each of instruction cache 46 and data cache 48.

L2 cache 44 includes an L2 cache entry array 54, which contains the actual program instructions or operand data, and an L2 directory 56, which contains the addresses of the various values stored in L2 cache entry array 54 and coherency state and inclusivity information for each line. L2 cache 44 also includes a cache controller 58 including one or more read/claim (RC) machines 60 and one or more snooper machines 62. RC machines 60 service requests received from higher levels in the cache hierarchy, i.e., from L1 data cache 48. Snooper machines 62 service requests received from other processing units via system bus 64. L2 cache 44 may include other conventional elements, such as additional interface unit (not shown) to facilitate communication with system bus 64.

If the L2 cache 44 of a first processing unit 40 receives a store request from the associated core 42 that hits a cache line in L2 cache directory 56 that has the inclusivity bit associated with instruction cache 46 turned on, a RC machine 60 of L2 cache 44 dynamically issues an icbi to the associated L1 instruction cache 46 to invalidate the now stale copy of the modified cache line. In addition, if L2 directory 56 does not indicate that the cache line is held exclusively locally (e.g., in the Modified or Exclusive state), the RC machine 60 issues a kill operation on system bus 64 to inform the caches in other processing units 40 to invalidate their copies of the cache line, if any.

When the kill operation is snooped on system bus 64 by snooper machines 62 of the other processing units 40, a similar process is followed. That is, upon snooping the kill operation on system bus 64, a snooper machine 62 in a second processing unit 40 utilizes the target address contained in the kill operation to access its L2 directory 56. If L2 directory 56 indicates a coherency state other than invalid, the snooper machine 62 invalidates the cache line by updating L2 directory 56. In addition, the snooper machine 62 checks the inclusivity bits associated with the target cache line and transmits a "back invalidate" (or icbi) to the appropriate one(s) of instruction cache 46 and data cache 48 to invalidate any other cached copies of the target cache line. Thus, in accordance with the present invention, cache controller 58 manages coherency for both instructions and data in response to kill (or other) operations on system bus 64, eliminating the need for separate software-generated icbi operations on system bus 64. As an additional note, it may also be desirable to synchronize the kill operation and associated invalidations, for example, by issuing a synchronizing operation on system bus 64.

The present invention thus reduces bus traffic by eliminating unnecessary icbi transactions. In fact, in the present invention, all icbi bus operations may be eliminated, thereby improving overall system performance and scalability. Those skilled in the art will appreciate that this approach is particularly advantageous for pipelined page copy procedures used to modify code, which typically result in numerous (e.g., 32) consecutive icbi bus operations.

Figure 3:
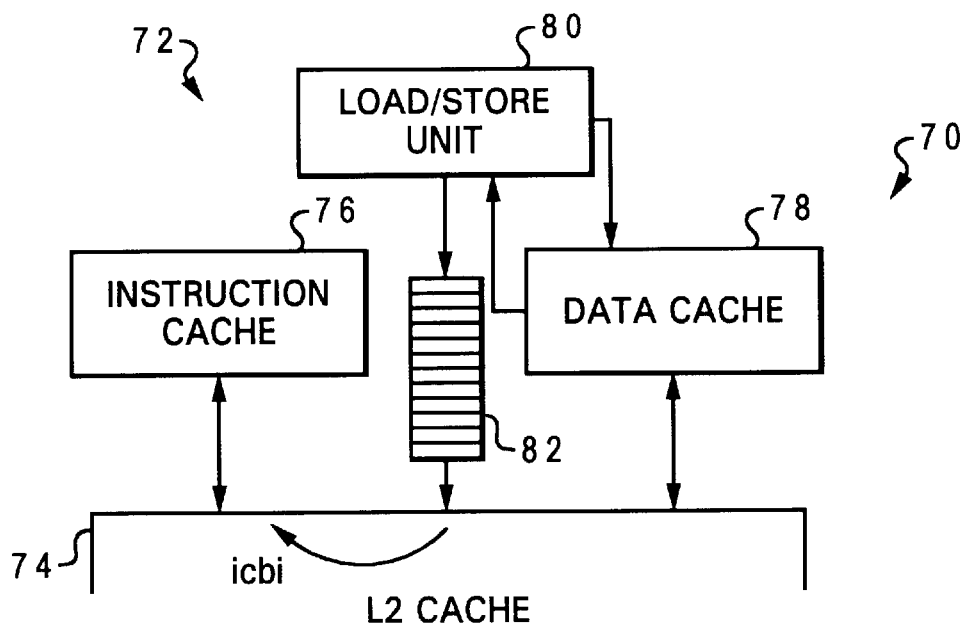
FIG. 3 is a block diagram of an alternative embodiment of a processing unit of a multiprocessor computer system constructed in accordance with the present invention, depicting a store-in (write-back) L1 data cache, with an L2 cache issuing a kill ("icbi") operation to the L1 instruction cache.

An alternative embodiment of a processing unit 70 of a multiprocessor data processing system constructed in accordance with the present invention is shown in FIG. 3. Processing unit 70 again primarily includes a processor core 72 and an inclusive L2 cache 74. Processor core 72 includes bifurcated L1 instruction and data caches 76 and 78, respectively. Each of these L1 caches communicates with a load/store unit (LSU) 80 of core 72. In this embodiment, L1 data cache 48 is a store-in (i.e., not store-through) cache. A store address queue 82 is used to continually propagate pipelined address sequences from load/store unit 80 in the processor core to L2 cache 74.

In response to receiving a store address from the processor core that hits a cache line with the inclusive bit set to indicate that a copy of the cache line is also held in instruction cache 76, an RC machine within L2 cache 74 sends an icbi signal to instruction cache 76 to invalidate the cache line. As discussed above, L2 cache 74 also generates an icbi signal in response to snooping a kill transaction that hits a cache line marked in the L2 cache directory as inclusive in instruction cache 76.

Figure 4:
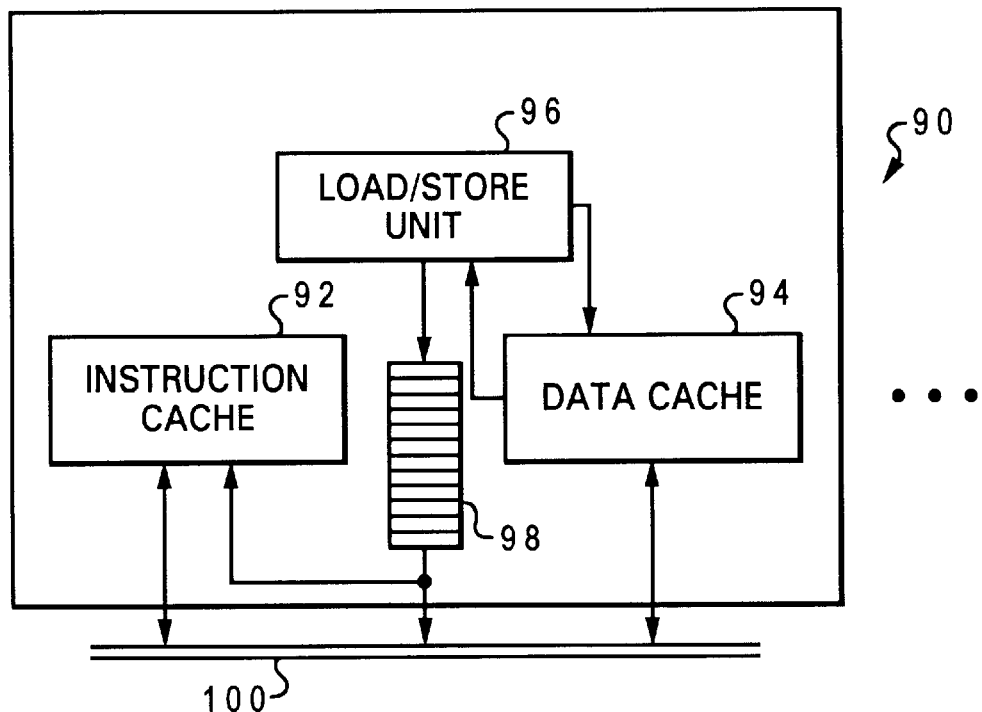
FIG. 4 is a block diagram of another embodiment of a processing unit of a multiprocessor computer system constructed in accordance with the present invention, depicting a store-in (write-back) L1 data cache similar to that of FIG. 3, but having no L2 cache.

Another alternative embodiment of a data processing system in accordance with the present invention is shown in FIG. 4. FIG. 4 illustrates a processing unit 90 similar to that of FIG. 3 that includes an L1 instruction cache 92, an L1 data cache 94, a load/store unit 96, and a store address queue 98; however, processing unit 90 does not include an L2 cache. L1 data cache 94 can be either a store-in (write-back) or a store-through cache.

In this embodiment, instruction cache 92 snoops both store address queue 98 and system bus 100 and, in response to detecting a store or kill operation, invalidates the target cache line in its directory in response to a snoop hit. Thus, in this embodiment also, no icbi operations are transmitted between processing units 90 on system bus 100 in response to modification of a cache line containing instructions since coherency for instruction cache lines is maintained by cache hardware rather than software. If software does explicitly issue an icbi instruction, the hardware in one embodiment of the invention many noop (ignore) the icbi.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method of maintaining coherency in a cache hierarchy of a processing unit of a computer system, said method comprising:

concurrently holding a first value corresponding to at least one program instruction in an instruction cache and a data cache of the processing unit;

issuing a data store request in the processing unit; and in response to said data store request, storing a second value in said data cache in lieu of said first value without storing the second value elsewhere in a memory hierarchy of the processing unit and sending an invalidation request identifying the first value to the instruction cache.

2. The method of claim 1, wherein the instruction and data caches communicate with a system bus of the computer system with no intervening lower level caches, said method further comprising snooping the data store request directly against the instruction cache.

3. The method of claim 1, wherein a lower level cache of the processing unit receives the data store request, and said sending step comprises sending the invalidation request from the lower level cache to the instruction cache.

4. The method of claim 3, and further comprising:

loading the value into the lower level cache; and setting first and second inclusivity bits in the lower level cache for the instruction cache and the data cache, respectively.

5. The method of claim 4, wherein said sending step is performed in response to a determination that the first inclusivity bit is turned on.

6. The method of claim 1, and further comprising:

in response to snooping a kill operation on a system bus of the computer system, invalidating said value in both said instruction cache and said data cache.

7. The method of claim 1, wherein said invalidation request is an icbi.

8. A computer system comprising:

a system memory device;

at least first and second processing units, said first processing unit having an instruction cache and a write-back data cache;

an interconnect coupling said system memory device and said processing units; and cache coherency means, responsive to receipt of a data store request requiring invalidation of a value corresponding to at least one program instruction loaded in the instruction cache, for sending an invalidation request identifying the value to said instruction cache.

9. The computer system of claim 8, wherein said instruction cache and said data cache communicate with said interconnect with no intervening lower level cache, and said cache coherency means snoops the data store request directly against said instruction cache.

10. The computer system of claim 8, wherein said first processing unit includes a lower level cache, and wherein said cache coherency means sends the invalidation request from the lower level cache to said instruction cache in response to said data store request.

11. The computer system of claim 10, and further comprising an inclusivity bit in said lower level cache that indicates whether the program instruction is stored in both said instruction cache and said lower level cache.

12. The computer system of claim 11, wherein said cache coherency means sends the invalidation request in response to a determination that the inclusivity bit is turned on.

13. The computer system of claim 8, wherein the first processing unit includes a store address queue, and wherein said cache coherency means receives the data store request from the store address queue.

14. The computer system of claim 8, wherein said cache coherency means receives the data store request from said interconnect.

15. The computer system of claim 8, wherein said cache coherency means sends the invalidation request as an icbi.

16. A processing unit, comprising:

at least one execution unit;

an instruction cache and a write-back data cache; and cache coherency means, responsive to receipt of a data store request requiring invalidation of a value corresponding to at least one program instruction loaded in the instruction cache, for sending an invalidation request identifying the value to said instruction cache.

17. The processing unit of claim 16, wherein said instruction cache and said data cache communicate with a computer system interconnect with no intervening lower level cache, and said cache coherency means snoops the data store request directly against said instruction cache.

18. The processing unit of claim 16, wherein said processing unit includes a lower level cache, and wherein said cache coherency means sends the invalidation request from the lower level cache to said instruction cache in response to said data store request.

19. The processing unit of claim 18, and further comprising an inclusivity bit in said lower level cache that indicates whether at least one program instruction is stored in both said instruction cache and said lower level cache.

20. The processing unit of claim 19, wherein said cache coherency means sends the invalidation request in response to a determination that the inclusivity bit is turned on.

21. The processing unit of claim 16, wherein the processing unit includes a store address queue, and wherein said cache coherency means receives the data store request from the store address queue.

22. The processing unit of claim 16, wherein said cache coherency means receives the data store request from a computer system interconnect.

23. The processing unit of claim 16, wherein said cache coherency means sends the invalidation request as an icbi.

* * * * *